United States Patent [19]

Heiligman

[11] Patent Number: 5,652,008
[45] Date of Patent: Jul. 29, 1997

[54] UNIVERSAL WATER FILTRATION DEVICE AND METHOD OF FILTERING WATER

[75] Inventor: Randy B. Heiligman, Minnetonka, Minn.

[73] Assignee: UltraPure Systems, Inc., Westmont, Ill.

[21] Appl. No.: 583,462

[22] Filed: Jan. 5, 1996

Related U.S. Application Data

[63] Continuation of Ser. No. 308,391, Sep. 19, 1994, abandoned, which is a continuation-in-part of Ser. No. 164,365, Dec. 9, 1993, Pat. No. 5,393,548, and a continuation-in-part of Ser. No. 107,643, Aug. 18, 1993, Pat. No. 5,411,661, and a continuation-in-part of Ser. No. 67,120, May 26, 1993, Pat. No. 5,318,703.

[51] Int. Cl.$^6$ .............. A23L 1/015; C02F 1/00; C02F 1/28
[52] U.S. Cl. .............. 426/422; 210/263; 210/282; 210/474; 210/497.01; 248/312.1
[58] Field of Search .............. 426/66, 422, 432, 426/423; 210/263, 264, 266, 282, 283, 473, 474, 477, 482, 488, 495, 497.01, 499, 497.3; 248/312.1, 314, 315

[56] References Cited

U.S. PATENT DOCUMENTS

| | | | |
|---|---|---|---|
| 329,505 | 11/1885 | Teeter | 210/474 |
| 370,275 | 9/1887 | Mendenhall | 210/474 |
| 416,634 | 12/1889 | Long | 210/473 |
| 462,076 | 10/1891 | Devoll | 210/474 X |
| 967,905 | 8/1910 | Hagg | 210/474 X |
| 1,015,946 | 1/1912 | Ebner | 210/474 |
| 1,052,440 | 2/1913 | Hagg | 210/474 X |
| 1,095,504 | 5/1914 | Jannoch | 47/35 X |
| 1,157,776 | 10/1915 | Hagg | 210/266 X |
| 1,168,544 | 1/1916 | Newlin | 210/474 X |
| 1,293,297 | 2/1919 | Anderson | 210/474 X |
| 1,536,890 | 5/1925 | Lagemann | 210/474 X |
| 1,547,855 | 7/1925 | Burson | 210/474 X |
| 1,621,684 | 3/1927 | Rabjohn et al. | 210/266 |
| 1,674,203 | 6/1928 | Holz et al. | 210/266 |
| 2,022,055 | 5/1935 | Juffa | 210/473 X |
| 2,224,577 | 12/1940 | Shively et al. | 210/263 X |
| 2,492,152 | 12/1949 | Hollowell | 248/312 X |
| 3,304,852 | 2/1967 | Lande | 99/319 |
| 3,339,743 | 9/1967 | Bealle | 210/266 X |
| 3,389,650 | 6/1968 | Micheilser | 426/433 |
| 3,420,675 | 1/1969 | Costas | 99/77.1 |
| 3,971,305 | 7/1976 | Daswick | 99/295 |
| 4,014,506 | 3/1977 | Hanson | 248/312.1 |
| 4,080,299 | 3/1978 | Bartolome | 210/479 |
| 4,283,283 | 8/1981 | Zimmerman | 210/282 |
| 4,528,095 | 7/1985 | Byrne | 210/206 |
| 4,764,274 | 8/1988 | Miller | 210/232 |
| 4,826,594 | 5/1989 | Sedman | 210/264 |
| 4,826,695 | 5/1989 | Tanner | 426/77 |
| 4,859,348 | 8/1989 | Jusaitis et al. | 210/799 |
| 4,867,875 | 9/1989 | Peranio | 210/186 |
| 4,867,880 | 9/1989 | Pelle et al. | 210/474 |
| 4,963,262 | 10/1990 | Johnstone | 210/474 |
| 4,995,975 | 2/1991 | Jacquot et al. | 210/266 |
| 4,999,109 | 3/1991 | Sabre | 210/282 |
| 5,049,272 | 9/1991 | Nieweg | 210/266 |
| 5,076,912 | 12/1991 | Belz et al. | 210/264 |
| 5,076,922 | 12/1991 | DeAre | 210/474 X |
| 5,186,830 | 2/1993 | Rait | 210/282 X |
| 5,221,475 | 6/1993 | Mealey et al. | 210/474 |
| 5,225,078 | 7/1993 | Polasky et al. | 210/264 |

*Primary Examiner*—Milton Cano
*Attorney, Agent, or Firm*—Kinney & Lange, P.A.

[57] ABSTRACT

A universal water filter for filtering water poured into an opening of the container. The water filter includes a filter unit and a support structure. The filter unit includes a housing having an inlet surface for receiving unfiltered water, an outlet surface for dispensing filtered water and a side surface between the inlet surface and the outlet surface. The support structure extends from the sidewall of the housing for supporting the water filter across the opening of the container. The support structure is adjustable along the circumference of the housing to vary the position of the support structure with respect to the size and shape of the opening of the container.

9 Claims, 3 Drawing Sheets

UNIVERSAL WATER FILTRATION DEVICE AND METHOD OF FILTERING WATER

CROSS-REFERENCE TO CO-PENDING APPLICATIONS

This is a continuation of application Ser. No. 08/308,391, filed Sep. 19, 1994, now abandoned, which is a continuation in part of application Ser. No. 08/164,365, filed Dec. 9, 1993, now U.S. Pat. No. 5,393,548 and continuation in part of application Ser. No. 08/107,643, filed Aug. 18, 1993, now U.S. Pat. No. 5,411,661 and continuation in part of application Ser. No. 08/067,120, filed May 26, 1993, now U.S. Pat. No. 5,318,703.

BACKGROUND OF THE INVENTION

The present invention relates to water filtration devices used in filtering impurities from water, and more particularly, to filtration devices which are placed over the opening of a container into which water is poured.

The taste and flavor of drinks and foods made from water is greatly effected by the quality of the water used to make them. Tap water in most municipalities is typically treated with chlorine and other chemicals to disinfect the water supply. However, the chlorine reacts adversely with the water, leaving a distinct "chlorine" taste and odor. The other chemicals in tap water also adversely effect the overall quality of the drinks and foods which are made with such water.

Water filtration devices have been designed to counteract the chemicals in tap water and typically include a layer of carbon granules or other suitable filtering media retained within a filter housing. When filling jugs, cups or other containers with tap water, conventional water filtration devices have been constructed to be held over the opening of the container or to fit permanently within the container itself. Those filtration devices which fit in or are placed above the opening of a container have fixed shapes and dimensions for use only with containers of a particular type and size. Additionally, the use of conventional filtration devices positioned directly across the opening of a container is hampered due to the differences in the size, shape and position of the pouring spout and handle between different containers. In other words, the irregular shapes of container openings makes if difficult for one filtration unit to be constructed for use with a variety of containers having pouring spouts and handles with different sizes, shapes and locations.

SUMMARY OF THE INVENTION

The present invention relates to a universal water filter for filtering water poured into an opening of the container. The water filter includes a filter unit and a support structure. The filter unit includes a housing having an inlet surface for receiving unfiltered water, an outlet surface for dispensing filtered water and a side wall between the inlet surface and the outlet surface. The support structure extends from the side wall of the housing for supporting the water filter across the opening of the container. The support structure is adjustable along radii of the housing to vary the position of the support structure with respect to the size and shape of the opening of the container.

In one embodiment the support structure includes a support member formed to the side wall of the housing, and a plurality of leg members mounted to and extending radially from the support member. Each leg member is adjustable along the circumference of the housing to vary the number and position of the leg members with respect to the opening of the container. Each leg member includes a first portion oriented substantially parallel to the inlet surface for supporting the filter unit across the opening of the container, and a second portion for mounting the leg member to the support member. More particularly, the support member may be in the shape of a ring forming a recess around the periphery of the side wall for engaging a hook shaped second portion of each leg member.

DETAILED DESCRIPTION OF THE PREFERRED EMBODIMENTS

Figure 1:
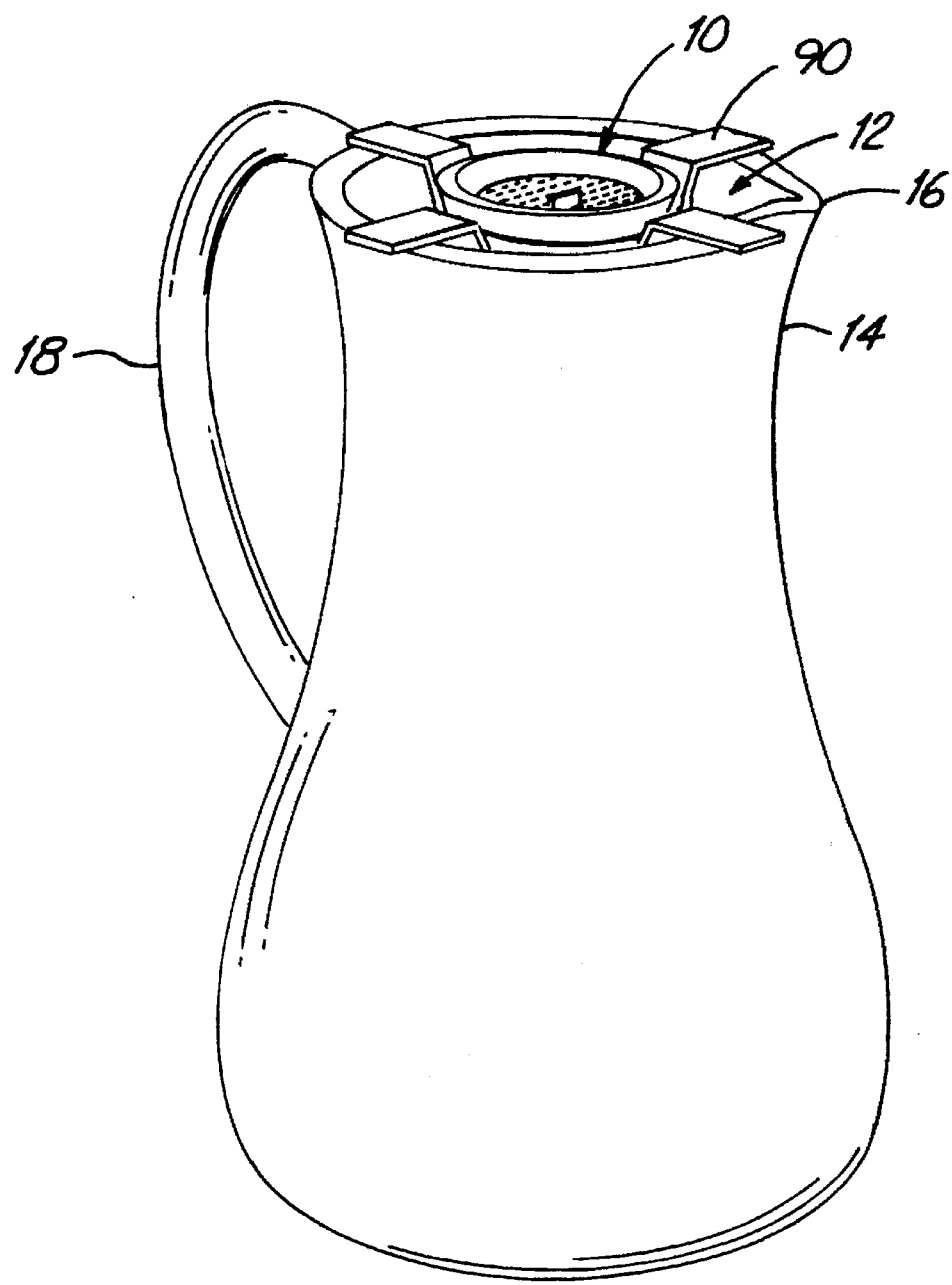
FIG. 1 is a perspective view of a universal filter device according to the present invention shown in use with a container.

As shown in FIG. 1, the present invention relates to a universal water filtration device 10 for filtering water poured into an opening 12 of a container 14. The water filtration device 10 is suspended across the opening 12 of the container 14 such that the water filtration device 10 may be adapted to fit the openings of a variety of containers regardless of the size and shape of the opening 12 and regardless of the position, size and shape of any pouring spout 16 or handle 18. The water filtration device 10 according to the present invention provides an apparatus for filtering water which is convenient to use, since it does not require manually holding the water filtration device 10 while water is poured through it and since the water filtration device 10 can be adjusted to fit a variety of containers.

Figure 2:
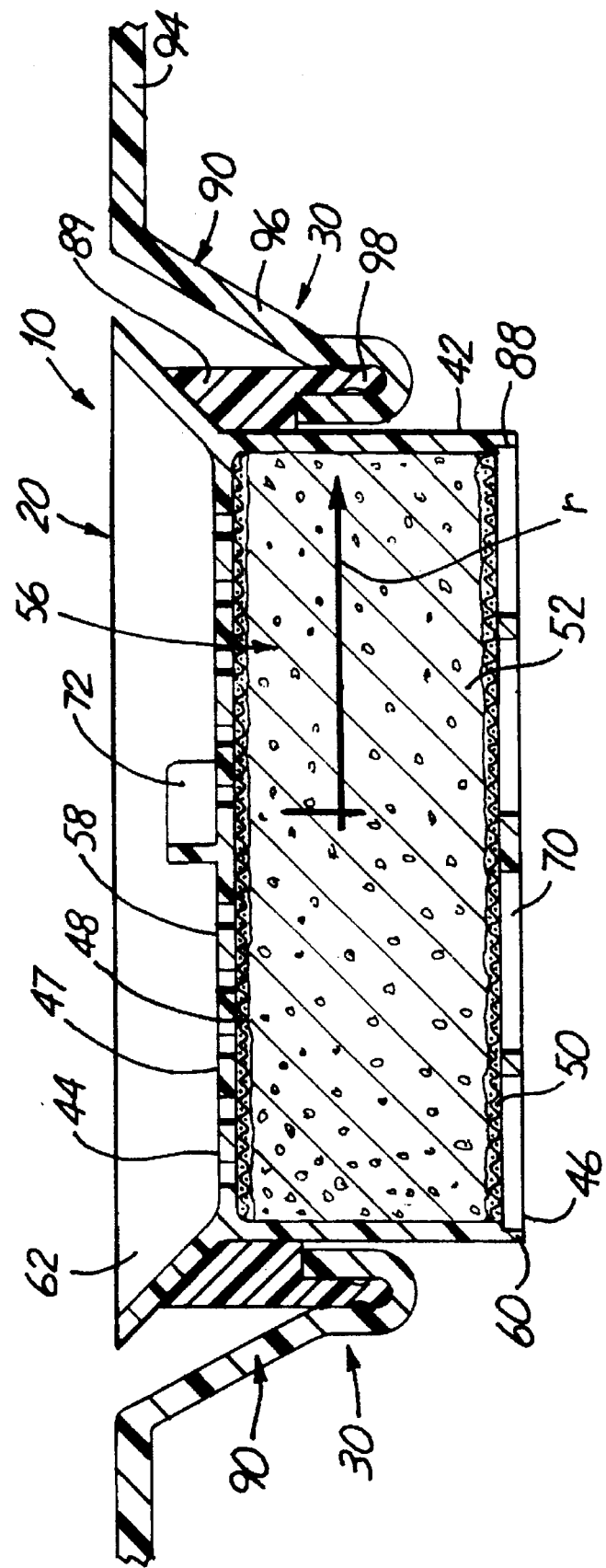
FIG. 2 is an enlarged sectional view of the water filtration device of FIG. 1.
Figure 3:
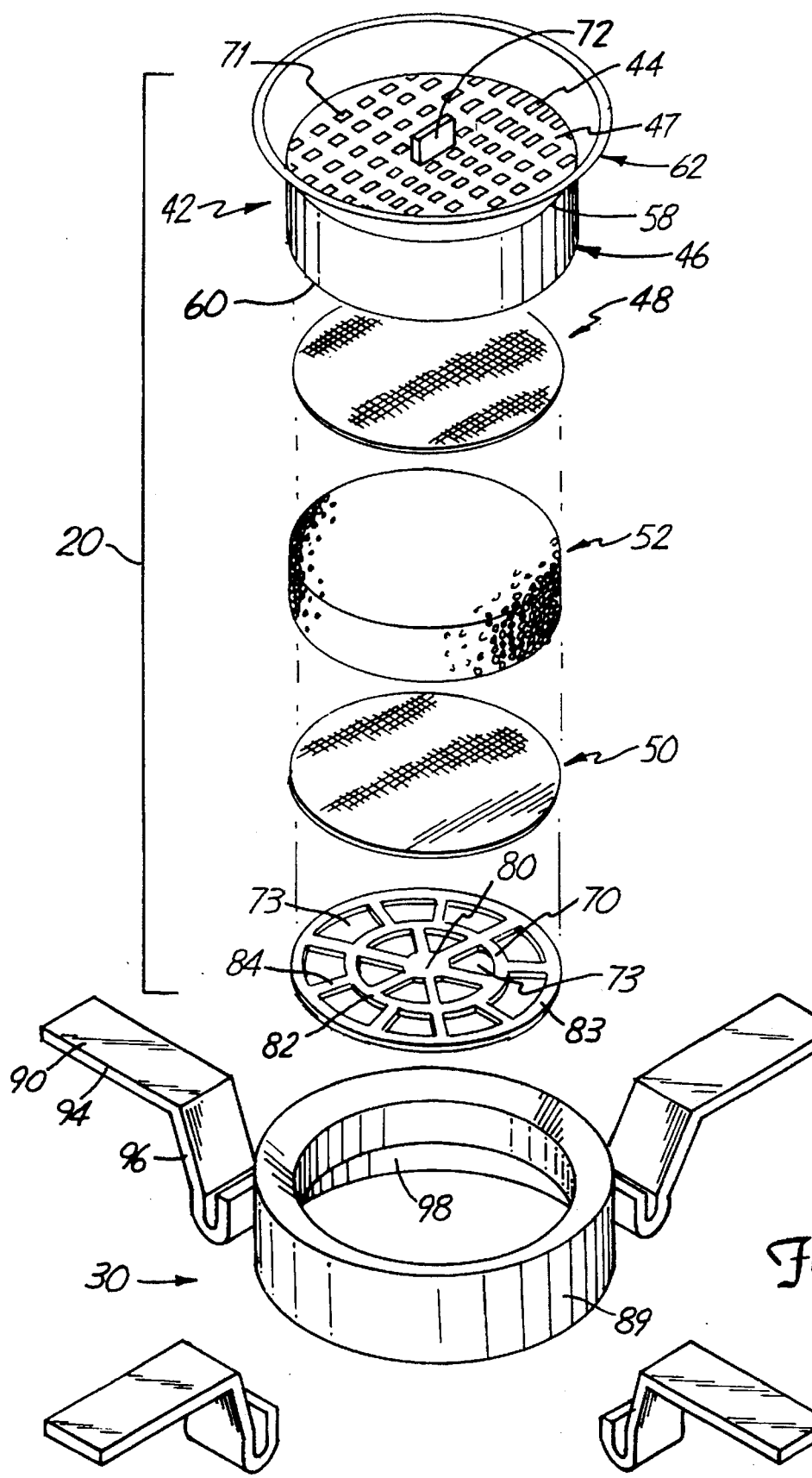
FIG. 3 is an exploded perspective view of the water filtration device of FIG. 1.

As shown in FIGS. 2 and 3, the water filtration device 10 includes a filter unit 20 for filtering water and a support structure 30 for supporting the filter unit 20 across the opening 12 of the container. More particularly, the support structure 30 is adjustable along any radii, r, of the filter unit 20 permitting varying of the position of the support structure 30 with respect to the size and shape of the opening 12 and with respect to the size, shape and location of any pouring spout 16 and/or handle 18.

The filter unit 20 includes a cylindrical filter housing 42 open at a top end 44 for receiving the water and open at a bottom end 46 for passing the filtered water, a first planar horizontal mesh member 47 positioned across the top end 44 of the filter housing 42, a first mesh screen 48 positioned below the first planar horizontal mesh member 47, a second mesh screen 50 positioned across the open bottom end 46 of the filter housing 42, a filter media 52 positioned between the first and second mesh screens 48 and 50, and a second planar horizontal mesh member 70 positioned below the second mesh screen 50 for engaging the lower end 46 of the filter housing 42 to close the filter housing 42 with the first mesh screen 48, the filter media 52, and the second mesh screen 50 contained therein.

The filter housing 42 defines a chamber 56 having an upper edge 58 and a lower edge 60, a flared annular lip 62 extending upwardly and radially from the upper edge 58 to define a funnel above the chamber 56 for receiving the water. The first planar horizontal mesh member 47 extends across the upper edge 58 to separate the annular lip 62 from the chamber 56. The chamber 56 has a diameter of approximately 3 inches, however the diameter of the chamber 56 may be varied so long as the chamber 56 is sufficiently small enough to fit entirely within the open of the desired container. The diameter of the filter housing 42 at the outside edge of the flared annular lip 62 is approximately 3.5 to 4 inches and the annular lip 62 makes an angle of approximately 45° with the first planar horizontal mesh member 47. Again, the size of the annular lip and the angle may be varied so long as the filter housing 42 fits entirely within the opening of the desired container. The filter housing 42 is preferably constructed of an injection molded polymer. However, it may also be constructed of metal, paper, cardboard, mesh material or other suitable material.

The first planar horizontal mesh member 47 includes a plurality of holes 71 formed thereon allowing the filtered water into the container 14, and a handle 72 for placing the universal water filtration device 10 in the opening of the container 14 and for removing the universal water filtration device 10 from the container 14. The handle 72 is preferably molded to the center of the first planar horizontal mesh member 47 such that it extends upward therefrom into the funnel where it is easily accessible.

A plurality of voids 73 on the second planar horizontal mesh member 70 are formed by a round center member 80, ring members 82 and 83 concentric to the round center 80, and a plurality of spoke members 84 connecting the center member 80 to the ring members 82 and 83. The plurality of voids 73 are formed between the intersecting center member 80, the ring members 82 and 83, and the spoke members 84. The positioning of the center member 80, the ring members 82 and 83, and the spoke members 84 may be varied. For example, the center member 80, ring members 82 and 83, and spoke members 84 may all be positioned between the filter media 52 and the second mesh screen 50, or the center member 80, ring member 82 and the spoke members 84 may be so positioned, or the spoke members 84 only may be so positioned. The second planar horizontal mesh member 70 is preferably constructed of an injection molded polymer. However, it may also be constructed of metal, paper, cardboard, mesh material or other suitable material.

The filter media 52 is encapsulated and confined within the cylindrical filter housing 42 between the first planar horizontal mesh member 47 and the first mesh screen 48 on one side and the second planar horizontal mesh member 70 and second mesh screen 50 on the opposite side. As shown in FIGS. 2 and 3, the filter media 52 is preferably loose carbon granules having a granular size in the range of approximately 5×100 mesh size. The carbon granules and available, for example, by Westvaco. Other materials such as KDF resin, as explained below, may be used as the filtering media 52 for the removal of chlorine for improved taste or for filtering out magnesium permeate for removing water "hardness". Different filter media 52 may be used independently depending upon filtration requirements, or may be mixed or blended with other appropriate media to provide for the treatment of multiple substances, such as unwanted taste, odor, dirt, sediment, scale lime or hardness, from the water. Examples of different filter media 52 include activated charcoal, KDF resin and magnesium permeate.

The first and second mesh screens 48 and 50 are preferably a nylon web configuration so as to permit the water to flow into and out of the filter media 52 and yet so as to retain the loose carbon granules or other filter media 52 within the filter housing 42. However, it is to be understood that the first and second mesh screens 48 and 40 may be any water permeable filtration media which contains the filter media 52 therebetween, such as plastic, metal, cardboard, paper, fibrous material or the like and which includes holes, slots or the like for the passage of the water. The first and second mesh screens 48 and 50, in addition to retaining the filter media 52 within the filter housing 42, also serve to provide additional filtration of impurities such as particulate matter. The first and second mesh screens 48 and 50 have a diameter of approximately 3 inches, however the diameter must be slightly less the diameter of the chamber 56 so that the mesh screens may be positioned within the chamber 56.

The filter unit 40 is assembled by affixing the first mesh screen 48 within the chamber 56 and to the underside of the first horizontal planar mesh member 47, such as by ultrasonic welding or other suitable means. The filter media 52 is then placed in the chamber 56 against the first mesh screen 48. Next, the second mesh screen 50 is secured to the second planar horizontal mesh member 70, such as by ultrasonic welding, and the second planar horizontal mesh member 70 is then positioned in an annular groove 88 at the lower edge 60 of the filter housing 42 such that the second mesh screen 50 is positioned adjacent to the filter media 52. The second planar horizontal mesh member 70 is secured within the annular groove 88 by ultrasonic welding, adhesives or other suitable securing means. In an alternative embodiment (not shown), the second planar horizontal mesh member 70 is molded integral to the chamber 56 and the first planar horizontal mesh member 66 is dropped in and secured to the chamber 56 once the first and second mesh screens 48 and 50 and filter media 52 are inserted into the cylindrical filter housing 42.

The support structure 30 includes a support member 89 mounted to the filter housing 42, and plurality of leg members 90 mounted to and extending radially from the support member 89. The support member 89 is ultrasonically bonded to the filter housing or attached by other suitable means including, but not limited to adhesives. Each leg member 90 is adjustably mounted to the support member 89 along the circumference of the filter housing 42 such that the number and position of the leg members 90 may be varied with respect to the opening 16 and/or handle 18 of the container. Each leg member 90 has a first portion 94 oriented substantially parallel to the first planar horizontal mesh member 47 and flush with the top of the annular lip 62 for supporting the filter unit 20 across the opening 12 of the container, and a second portion 96 for mounting each leg member 90 to the support member 89. In a preferred embodiment the support member 89 is formed as a filter ring extending outward from and along the outer surface of the side wall of the filter housing 42 such that a flange 98 is formed which extends in a direction toward the bottom end 46 of the filter housing. The second portion 96 of each leg member is preferably hook shaped for engaging the flange 98.

In the illustrated embodiment there are provided four leg members 90 engaged to the flange 98 of the support member 89. Each leg member 90 is constructed of molded plastic and has a width of approximately ½ inch and a length of approximately 1½ inches. Of course, it is intended to be within the scope of the present invention that the size and shape of each leg member 90 may be varied to provide further adaptability of the universal filter for larger containers. In addition, the number and size of each leg member 90 and the manner in which each leg member 90 engages the support member 89 may also be varied. Furthermore, the leg member 90 may be mounted directly to the filter housing without the need for a separate support member 89.

In operation, the universal water filtration device 10 is positioned across the opening 12 of the container which is to be filled with water for the preparation of food or drinks. The number and position of the leg members 90 of the support structure 30 is adjusted with respect to the pouring spout 16 and the handle 18 to suspend the filter unit 20 across the opening 12 of the container. More particularly, the radial position, r, of each leg member 90 with respect to the flange 98 of the support member 89 is adjusted such that each leg member 90 engages a portion of the wall forming the container opening 12. The filter unit 20 is thus suspended in the mouth of the container 14 so that the filter outlet directs water into the container 14. The container 14 complete with the universal water filtration device 10 is positioned under a faucet or the like and the tap water then collects in the funnel of the filter unit 40 where it is retained therein so that there is no spill over, thereby ensuring that all of the water is filtered. The water then passes through the plurality of holes 71 in the first planar horizontal mesh member 47 and through the first mesh screen 48 which filters out large granular impurities or other undesirable material such as sediment or dirt particles. After the coarse filtering provided by the first mesh screen 48, the water is filtered through the loose carbon granules of the filter media 52 which removes the bacteria, chlorine, and other impurities and then through the second mesh screen 50. The filtered water then passes through the plurality of voids 73 in the second planar horizontal mesh member 70 and then flows into the container 14. Approximately 95% of the chlorine is removed by using the universal water filtration device 10 according to the present invention.

Although the present invention has been described with reference to preferred embodiments, workers skilled in the art will recognize that changes may be made in form and detail without departing from the spirit and scope of the invention.

What is claimed is:

1. A universal water filter for filtering water poured into an opening of a container, the universal water filter comprising:

a filter unit having a housing and a water filtration media contained within the housing for removing impurities from water passed therethrough, the housing having an inlet surface for receiving unfiltered water, an outlet surface for dispensing filtered water, and a side wall located between the inlet surface and the outlet surface having an inner surface and outer surface, the filtration media contained by the inlet surface, the outlet surface of the housing and the inner surface of the side wall; and a support member extending from the outer surface of the side wall of the housing for suspending the filter unit across the opening of the container, the support member including a flange extending outward from and along the outer surface of the side wall of the housing parallel to the side wall of the housing such that a recess is formed which opens in a direction toward the outer surface, and a plurality of leg members mounted to the flange and extending radially from the housing, each of the leg members being individually adjustable along the circumference of the flange to permit the number and position of the leg members to be varied with respect to the opening of the container.

2. The universal water filter of claim 1, wherein each leg member has a first portion oriented substantially parallel to the inlet surface for supporting the water filter across the opening of the container, and a second portion for mounting the leg member to the support member.

3. The universal water filter of claim 1, wherein the second portion of each leg is hook shaped for engaging the flange.

4. The universal water filter of claim 1, wherein the first portion of each leg has a length greater than 1 inch.

5. The universal water filter of claim 1, wherein the filter unit further comprises a first mesh screen adjacent the inlet surface.

6. The universal water filter of claim 5, wherein the filter unit further comprising a second mesh screen adjacent the outlet surface.

7. The universal water filter of claim 1, wherein the housing includes a flared annular lip extending upwardly and radially from the inlet surface to define a funnel for receiving and preventing water overflow before water passes through the inlet surface.

8. A method of filtering chemical impurities from water poured into an opening of a container comprising the steps of:

providing a filter unit having a housing and a water filtration media contained within the housing for removing impurities from water passed therethrough, the housing having an inlet surface for receiving unfiltered water, an outlet surface for dispensing filtered water, a side wall located between the inlet surface and the outlet surface having an inner surface and outer surface, the filtration media contained by the inlet surface, the outlet surface of the housing and the inner surface of the side wall, and a support member extending from the outer surface of the side wall of the housing for suspending the filter unit across the opening of the container, the support member including a flange extending outward from and along the outer surface of the side wall of the housing parallel to the side wall of the housing such that a recess is formed which opens in a direction toward the outer surface, and a plurality of leg members mounted to the flange and extending radially from the housing, each of the leg members being individually adjustable along the circumference of the flange to permit the number and position of the leg members to be varied with respect to the opening of the container;

placing the water filter unit onto the opening of the container;

positioning the support member to avoid intersecting with a mouth and a handle of the container; and pouring water through the filter unit into the container such that chemical impurities are removed from the water.

9. The method of claim 8, further comprising the step of: removing the filter unit from the container after the container is filled with the filtered water.

* * * * *